United States Patent [19]

Divan

[11] Patent Number: 5,017,800
[45] Date of Patent: May 21, 1991

[54] AC TO DC TO AC POWER CONVERSION APPARATUS WITH FEW ACTIVE SWITCHES AND INPUT AND OUTPUT CONTROL

[75] Inventor: Deepakraj M. Divan, Madison, Wis.

[73] Assignee: Wisconsin Alumni Research Foundation, Madison, Wis.

[21] Appl. No.: 414,896

[22] Filed: Sep. 29, 1989

[51] Int. Cl.$^5$ .................... H02J 9/00; H02M 5/458
[52] U.S. Cl. ........................................ 307/66; 363/37
[58] Field of Search .................... 307/66; 363/36, 37

[56] References Cited

U.S. PATENT DOCUMENTS 4,644,241  2/1987  Maeda ................................. 363/36
4,933,831  6/1990  Takahashi et al. ................... 363/37

FOREIGN PATENT DOCUMENTS 233069   10/1987  Japan .
2111326   6/1983  United Kingdom ................. 307/66

OTHER PUBLICATIONS

T. Kawabata et al., "Chargerless UPS Using Multi-Functional BIMOS Inverter", IEEE-IAS Conf. Record, 1986, pp. 513–520.
S. Manias et al., "Bilateral DC to AC Converter Employing a High Frequency Link", IEEE-IAS Conf. Record, 1985, pp. 1156–1162.
K. P. Gokhale et al., "Dead Beat Microprocessor Control of PWM Inverter for Sinusoidal Output Waveform Synthesis", PESC 85 Conf. Record, pp. 28–36.
D. M. Divan et al., "Zero Switching Loss Inverters for High Power Applications", IEEE-IAS Conf. Rec., 1987, pp. 626–639.
G. Venkataramanan et al., "Discrete Pulse Modulation Strategies for High-Frequency Inverter Systems", IEEE-PECS Conf. Record, 1989.

*Primary Examiner*—William H. Beha, Jr.
*Attorney, Agent, or Firm*—Foley & Lardner

[57] ABSTRACT

Power conversion apparatus for AC to DC to AC power conversion includes a rectifier bridge formed of rectifying devices (24,25) connected to an AC source (21) and providing a DC output to DC bus lines (27,28). A full bridge of active switching devices (30, 31, 34, 35) is connected across the DC bus lines to which a power source such as a battery (39) may also be connected. The load (36) and the AC power supply (21) share a common neutral line (33). The output of the bridge can provide AC output power to the load through a transformer (74). The power conversion apparatus allows full control of the currents on the load lines and AC input lines, even when the input and output are asynchronous. By providing an external DC power source such as a battery (39), uninterrupted power can be supplied to the load when the AC power source fails.

12 Claims, 5 Drawing Sheets

AC TO DC TO AC POWER CONVERSION APPARATUS WITH FEW ACTIVE SWITCHES AND INPUT AND OUTPUT CONTROL

FIELD OF THE INVENTION

This invention pertains generally to the field of electrical power conversion systems and particularly to power converters utilized in uninterruptable power supply systems and single to three phase converters.

BACKGROUND OF THE INVENTION

Uninterruptable power supplies (UPS) are widely applied for a variety of critical loads, including computers, financial transaction handlers and life support equipment. A proliferation of power electronic loads on the utility grid has caused a significant increase in harmonic levels on the AC lines. Further, the use of computers on a very large scale has made the issue of the cleaness of the power available on the power system more critical. Although UPS systems have been used in the past for large computer installations, the increased dependency of business and industry on computers has seen a tremendous increase in the use of UPS systems even for small computers operating off single phase supply lines.

Given the decreasing cost of computing capability, single phase UPS systems are extremely sensitive to cost. Consequently, few UPS manufacturers can afford the luxury of offering improved power factor interface to the utility. However, the possibility of harmonic standards being enforced is very real, and more importantly, the restriction of RMS current supplying capability for commercial or domestic line frequently limits the rating of the largest unit that can be fed from the available supply. Consequently, units with a poor power factor will be able to draw less power from the supply mains than a comparable unit with sinusoidal input line currents. A third harmonic overload in neutral conductors is another result of AC line current harmonics, and are often encountered in the use of typical UPS systems and switched mode power supplies.

Two approaches have primarily been utilized for commercial UPS systems. One approach uses a ferroresonant transformer as a voltage regulator. Line conditioning is completely passive and the technique is very robust, giving good immunity against disturbances. Under normal operation therefore, power flow does not occur through the transfer devices. On identifying failure of the AC line, the inverter is brought on line, the connection to line power is cut off, and the inverter continues supplying the load. During normal operation, the inverter can also be used to recharge the battery. This technique has high efficiency and reliability as well as moderate cost. However, the ferro-resonant transformer tends to be fairly heavy, and transitions from AC line to inverter operation can encounter problems under certain low or high line conditions. The quality of the output waveform under non-linear loads can also be very poor.

The other common approach is the so-called on-line UPS system in which a separate AC to DC converter is used to provide battery charging and regulation function. The DC bus is supported by the battery and feeds a DC to AC inverter with appropriate filtering. Static by-pass switches are used to revert the output power to the AC line in the event of failure of the inverter. Such a scheme provides power from the main power lines under normal operation, but only after two stages of power processing. Consequently, although the system has good performance, it is more expensive and less efficient.

Another approach reported recently may be referred to as a stand-by utility interactive UPS system. See, T. Kawabata, et al., "Chargerless UPS Using Multi-Functional Mi-MOS Inverter," IEEE-IAS Conf. Rec., 1986, pp. 513-520. Using such a technique, the need for two power conversion stages is eliminated, and the inverter charges a high voltage DC battery while the system is in the stand-by mode. This approach, however, allows no line conditioning in terms of voltage correction, disturbance rejection, or reactive/harmonic compensation. The approach can be varied so that the inverter is used to simultaneously function as an active filter to improve the line current waveform, as well as to maintain the state of the charge on the battery. This approach requires higher inverter ratings and bulky series filter components.

High frequency link systems which would result in substantial reductions in transformer size and cost have been proposed. See, e.g., S. Manias, et al., "Bilateral DC to AC Converter Employing a High Frequency Link," IEEE-IAS Conf. Rec., 1985, pp. 1156-1162; I. Yamato, et al., "New Conversion System For UPS Using High Frequency Link," IEEE-PESC Conf. Rec., 1988, pp. 658-663. While the concept of high frequency links is very sound, its usefulness in UPS applications may be questionable. Upon inverter failure, the bypass arrangement now has to be accomplished without isolation. If the system is to operate under those conditions for any length of time, it may not be acceptable. Further, the presence of a static bypass arrangement already involves non-isolated contact between the supply and load sides, completely obviating the function of the high frequency transformer. However, the objectives of UPS availability can also be provided for by multiple units operating in parallel.

None of the approaches discussed above simultaneously satisfy the requirements of load regulation with nonlinear loads, single stage power conversion, small filter components, and sinusoidal AC line currents with unity power factor.

SUMMARY OF THE INVENTION

The present invention provides a power conversion apparatus having a minimum number of active switches and is especially adapted to single phase UPS systems. It takes advantage of the fact that power flow in most UPS applications is completely unidirectional, that is, from AC line to load. The conversion apparatus requires the utilization of only four active switches to realize its objectives. These include independent control of the input and output currents, a common neutral connection, line conditioning, sinusoidal input currents independent of load currents, as well as battery charge and discharge regulation. Five switches may be utilized if a low voltage battery and resonant link operation is desired.

The power conversion apparatus of the invention allows full control of the currents on the load and AC lines sides, even when the input and output are completely asynchronous. The apparatus can operate with unity input power factor and deliver a high quality waveform to the load.

The conversion apparatus of the invention includes a full bridge of active switching devices connected across DC bus lines to which the battery is also connected. The single phase input line supplies rectified power to the DC bus through a rectifier bridge. The load and the AC supply line share a common neutral line. The switching of the switching devices in the bridge is controlled to provide AC output power to the load through a transformer. Static switches can be connected in the line from the bridge inverter to the transformer, and another static switch can be provided in a line directly from the supply line to the transformer, to allow the inverter to be switched out and thereby operate the load directly from the AC supply lines until a line failure is detected. The inverter can also be operated to provide line conditioning and distrubance rejection while power is being supplied from the main AC power lines, and allows the backup battery to be charged during standby operation.

The apparatus of the invention can also be implemented utilizing a resonant DC link and a fifth active switch can be employed to convert the circuit to a soft-switching resonant DC link converter, allowing the use of a lower voltage battery. This permits switching frequencies which are an order of magnitude higher than in conventional hard switching inverters.

Further objects, features, and advantages of the invention will be apparent from the following detailed description when taken in conjunction with the accompanying drawings.

DETAILED DESCRIPTION OF THE INVENTION

Figure 1:
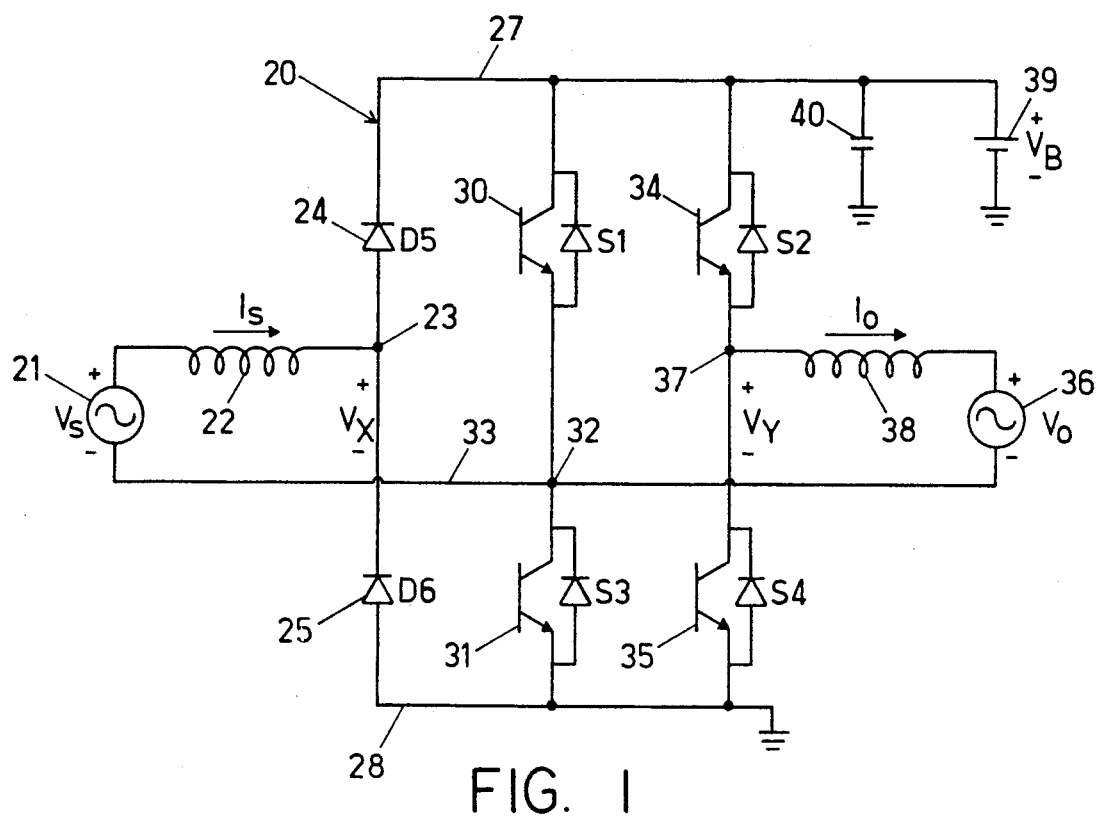
FIG. 1 is a schematic circuit diagram of a power conversion apparatus in accordance with the invention with input and output control.

A schematic circuit diagram of the basic power conversion apparatus of the invention is shown generally at 20 in FIG. 1. The apparatus receives AC power from a single phase source 21, which may be AC power mains, through an input inductor 22, which may represent an input transformer inductance. The inductor 22 is connected to a node 23 between a pair of diodes 24 and 25 to rectify the input AC current passed through the inductor 22 to a DC current and a DC voltage between DC bus lines 27 and 28. Also connected across the DC bus lines 27 and 28 is a inverter bridge formed of gate controlled active switching devices 30, 31, 34 and 35. Each of these switches, which may be bipolar junction transistors, typically would include antiparallel diodes as shown in FIG. 1. The electrical connection between the switches 30 and 31 is joined at a node 32 to a common neutral line 33 which extends from the input power source to the output load 36, represented as a voltage source in FIG. 1. The output of the bridge composed of the switches 30, 31, 34 and 35 is supplied from a connection at a node 37 to an output inductor 38 (which may represent an output transformer inductance) which delivers the current passed through it to the load 36. The backup storage battery 39, or output filter if required, is connected to the DC bus line 27, as is a smoothing capacitor 40.

The inverter bridge operates under a pulse width modulation strategy which chooses one of three switching states (+1, 0 and −1). The choice of the zero state can be fullfilled by turning on switches 30 and 34 (zero positive, 0+) or 31 and 35 (zero negative, 0−) simultaneously, with no discernible difference from the point of view of the load. This fact represents an additional degree of freedom which can be exploited to control the AC line side current.

For example, if the current $I_s$ flowing through the inductor 22 is positive as shown in FIG. 1, the diode 24 is seen to be conducting. By selecting the switches 30 and 34 to realize the zero state (0+), zero volts is impressed across the input lines (the voltage $V_x$), while selecting the switches 31 and 35 (0−) results in the DC bus voltage $V_B$ (the voltage of the battery) as the voltage $V_x$ between the node 23 and the common line 33. For positive voltage from the voltage source, $V_s$, this results in the current $I_s$ increasing or decreasing, respectively. Similarly, for negative values of $V_s$ and $I_s$, the diode 25 conducts and selecting the 0+ state gives $V_x = -V_y$ while the 0− states gives $V_x = 0$. The diodes 24 and 25 constrain power flow to be unidirectional from the AC lines to the DC bus capacitor 40. Thus, the circuit functions in the manner of a semi-controlled converter with active switches.

The degree of control available on the input side depends strongly on the number of times the inverter is allowed to choose the zero state. This implies that a higher ratio of $V_B$ to $V_o$ is required to obtain good control on both sides. On the other hand, every selection of a non-zero state reduces the amount of control available for the input sides. Consequently, full control on both the input and output sides is only available over a restricted range of input and output voltages.

Figure 2:
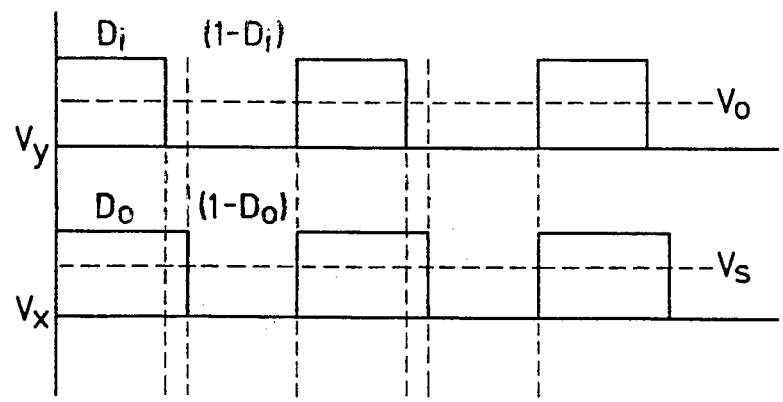
FIG. 2 are illustrative voltage waveforms for DC modulation of the conversion appparatus of FIG. 1.

This relationship can be examined by considering DC input voltages assuming pulse width modulation controls. If such DC input voltages are provided (rather than the normal AC from the power mains), the resulting waveforms for the voltages $V_x$ and $V_y$ are shown in FIG. 2. The inverter operates between the state 1 (switches 30 and 31 conducting) and state zero with a duty cycle $D_i$ to give a positive output voltage $V_o$. For positive values of $V_s$ and $I_s$, the diode 24 conducts all the time. As the switches 31 and 34 conduct for $D_i$, the voltage $V_x$ is contrained to be at the DC bus level $V_B$ at least for that period of time. During the time that the inverter is in the zero state, the 0+ or 0− state can be chosen to achieve the desired control. For DC input voltages this gives the following relationships.

$$V_o = D_i \cdot V_B$$

$$V_s \geq D_i \cdot V_B = V_o$$

Consequently, if full control on input and output are to be obtained, $V_s$ must be greater than $V_o$. Similarly for negative values of $V_o$ and for positive values of $V_s$, the relationships are seen to be:

$$V_o = -(1 - D_i) \cdot V_B$$

$$V_s \leq D_i \cdot V_B = 1 + V_o / V_B$$

Figure 3:
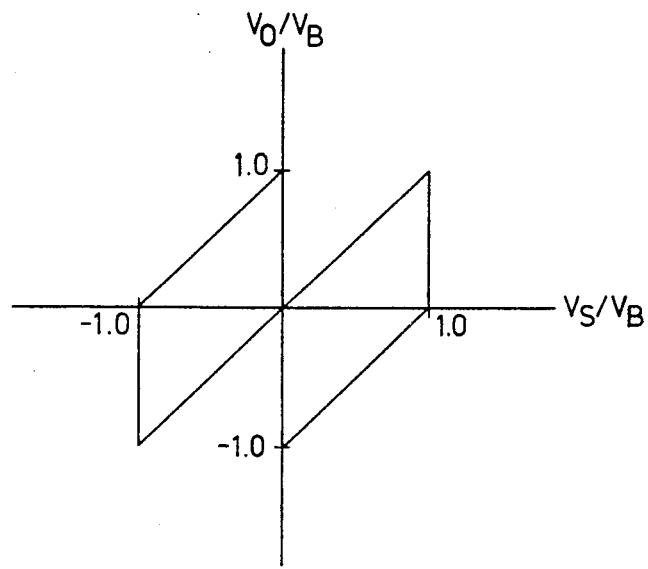
FIG. 3 is a plot showing the locus of possible values of the battery voltage for the conversion apparatus of FIG. 1.

For negative values of $V_s$, a similar set of equations can be determined. These contraint equations are illustrated in the graph of FIG. 3 and show that, in the steady state, if both $V_s$ and $V_o$ have the same polarity, then the converter works as a buck converter and has a limitation on the maximum possible output voltage that can be realized. Where $V_o$ and $V_s$ have opposite polarity, any ratio of $V_o$ to $V_s$ can be obtained. However, there is a maximum simultaneous voltage limitation on $V_o$ and $V_s$ of ½ the DC bus voltage. These limitations are important if input and output control are to be fully maintained under DC conditions. Under AC operations, the energy storage in the DC link can substantially alter the behavior of the converter.

Figure 4:
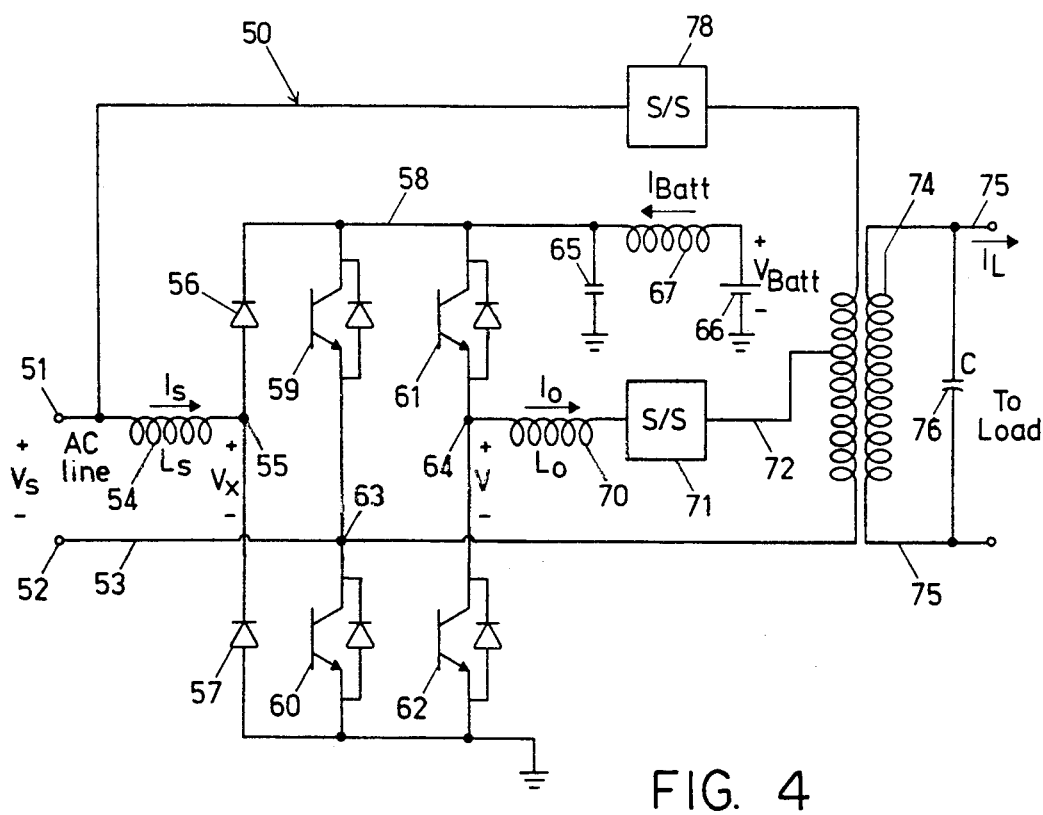
FIG. 4 is a schematic circuit diagram for a UPS system utilizing the present invention.

The foregoing AC to DC to AC conversion apparatus can be adapted for UPS operation as shown in FIG. 4. The important requirements now include maintaining charge and discharge of the storage battery on the link, in addition to regulation of the input and output currents. The load side output may be controlled using a current regulator, in accordance with output voltage regulation and distortion requirements. The input side may also be current regulated, and the reference command is calculated based on battery charge and discharge needs as well as load demands.

The UPS system in accordance with the present invention is shown generally at 50 in FIG. 4 and receives AC line power on AC terminals 51 and 52 from the power mains. One of the terminals 52 is connected to the common or neutral line 53 of the apparatus, while the other terminal 51 is connected to an input inductor 54 which supplies current to a node 55. The node 55 is connected between a pair of diodes 56 and 57 which are connected across the DC bus line 58 and ground. A bridge inverter formed of four active switching devices 59–62 is also connected across the DC bus 58 and ground in a manner similar to that described above with respect to the circuit of FIG. 1. The node 63 between the switching devices 59 and 60 is connected to the common line 53 and the node 64 between the switching devices 61 and 62 is the output voltage connection from the bridge. Also connected to the DC bus are a smoothing filter capacitor 65 to ground and a battery 66 through a filtering inductor 67.

The output voltage from the bridge at the node 64 is supplied through an output inductor 70, a controllable static switch 71 and a line 72 to a tap in the primary of a transformer 74. The secondary of the transformer 74 is connected to an output line 75 leading to the load, with the capacitor 76 connected across the line 75 to filter output transients. To complete the circuit, a controllable static switch 78 is connected in a line from one of the AC input terminals 51 to the primary of the transformer 74. Thus, when the static switch 78 is closed, the voltage across the AC input lines 51 and 52 will be provided across the primary of the transformer 74.

The system of FIG. 4 can operate as an on-line UPS and provide line conditioning and distubance rejection. The transformer tap is selected such that under low-line conditions the converter bridge formed of the devices 59–62 can adequately supply the load. During the bypass mode, the static switches 70 and 78 are activated to directly connect the load to the primary of the transformer. A particularly desirable feature of this circuit is the use of a common neutral connection between the input line at the terminal 52 and the output at the primary of the transformer 74.

Figure 5:
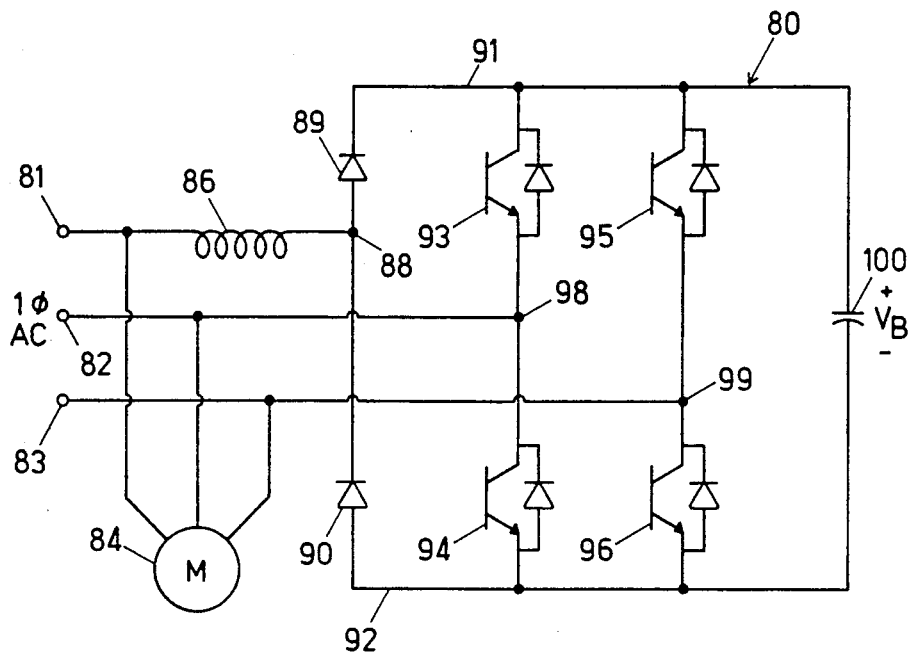
FIG. 5 is a schematic circuit diagram of a single phase to three phase converter incorporating the conversion apparatus of the present invention.

The AC to DC to AC conversion apparatus of the invention can also be adapted to be utilized as a single phase to three phase converter, as illustrated generally at 80 in FIG. 5. The system 80 receives single phase AC power at input terminals 81 and 82 but has a third terminal 83 on which is generated a voltage which effectively causes the power across the three terminals 81, 82 and 83 to be a three phase voltage which may be applied to a three phase load, such as the motor 84 illustrated in FIG. 5. The input voltage on one of the terminals 81 is provided through an input inductor 86 to a node 88 at which rectifying diodes 89 and 90 are joined. The output of the diodes 89 and 90 is provided to DC bus lines 91 and 92 across which is connected a bridge inverter composed of active switching devices 93–96. At a node 98 a connection is made between the switching devices 93 and 94 and the second AC input terminal 82. The output of the inverter at a node 99 connected between the switching devices 95 and 96 is connected to the third terminal 83. A capacitor 100 is connected across the DC bus to smooth out the voltage on the bus and provide a stored DC voltage across the bus lines.

Because the output inverter composed of the switching elements 93–96 can supply voltage and current having an arbitrary phase/frequency relationship with the input, and because the neutral connection at which the input terminal 82 is connected to the node 98 is common, the inverter can be made to synthesize a waveform with the same voltage as the input, but phase shifted so as to generate a balanced, three phase voltage. This inverter can then be used to drive a three phase load indicated by the motor 84, for example, a constant speed induction machine.

The use of high voltage batteries in UPS systems often creates reliability and cost issues. To use a lower voltage battery normally requires extra devices to perform the bi-directional chopper interfaces between the battery and the DC link. However, the conversion apparatus of the present invention can be readily adapted to be utilized as a soft switching resonant DC link inverter with frequencies which are an order of magnitude higher than conventional hard switching inverters. This resonant link circuit is illustrated generally at 110 in FIG. 6. Operation with bipolar junction transistors (BJT) darlingtons at 30 kHz for 15 kVA inverters is easily feasible. With IGBTs and new devices such as the MCT, link frequencies up to 60 kHz are possible. The circuit is easily realized at the multi-kilowatt power levels of interest. The use of a soft switching circuit achieves substantial benefits in terms of the size of filter components, acoustic noise, electromagnetic interference, and system efficiency.

Figure 6:
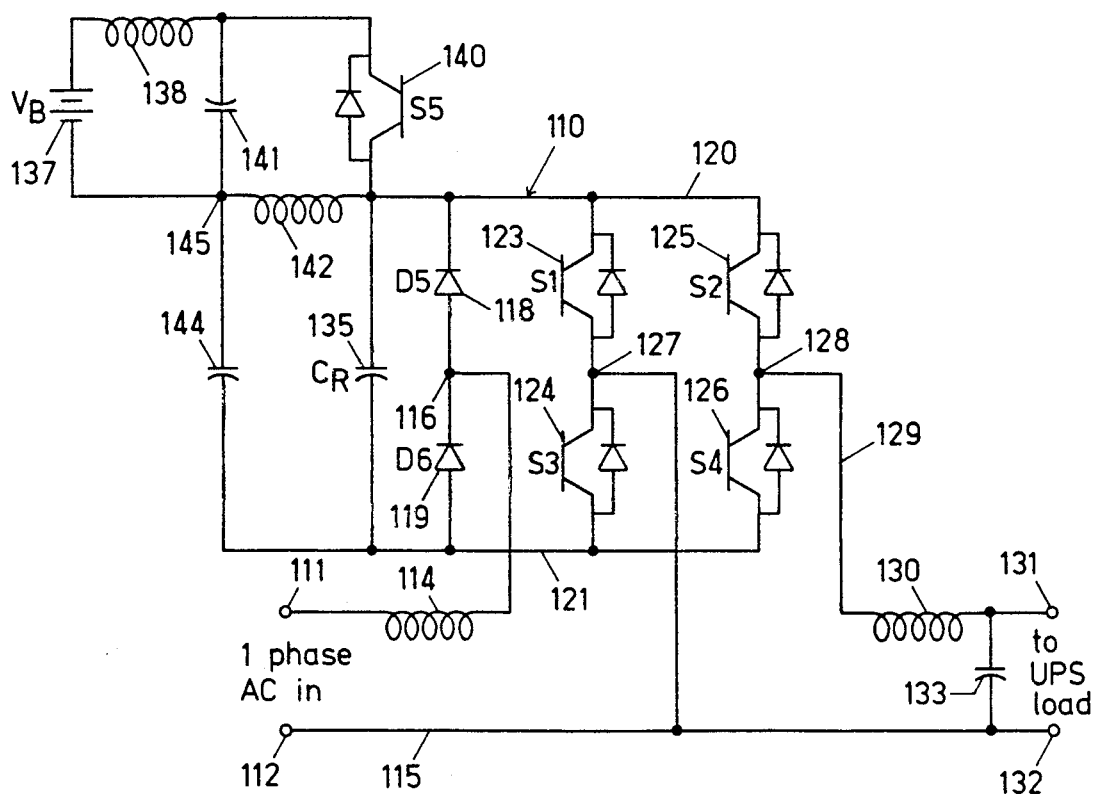
FIG. 6 is a schematic circuit diagram of a UPS power conversion apparatus utilizing a resonant DC link connected to the battery.

The high frequency DC link conversion apparatus 110 of FIG. 6 receives single phase power at input terminals 111 and 112, with one of the terminals connected to an input inductor 114 and the other connected to a common output line 115. The inductor 114 is connected to a node 116 that joins two diodes 118 and 119. The diodes 118 and 119 are connected between DC bus lines 120 and 121, as is an inverter composed of gate controlled active switching devices 123–126 connected in a bridge configuration. The junction between the switching devices 123 and 124 at a node 127 is connected to the common line 115, and the junction between the switching devices 125 and 126 at a node 128 is connected to an output line 129 leading to an output inductor 130 which extend to one of the output terminals 131, to which the UPS load may be connected. The other output terminal 132 is connected to the common line 115, and an output filtering capacitor 133 is connected between the terminals 131 and 132.

A capacitor 135 is connected between the DC bus line 120 and 121 and charges to provide a DC voltage across these lines. The battery 137 is connected to the DC bus line 120 by a resonant link circuit composed of a series inductor 138 and an active switching device 140. A capacitor 141 and inductor 142 are also connected to the DC bus line 120 and are joined at a node 145 to which the battery is also connected. A capacitor 144 extends from the node 145 to connection to the other DC bus line 121. The switching of the device 140 can be controlled to provide a resonant DC link voltage on the DC bus 120 in a conventional manner. See, for example, D. M. Divan, et al., "Zero Voltage Switching Inverters for High Power Applications," IEEE-IAS Conf. Rec. 1987, pp. 625–639, and G. Venkataramanan, et al., "Discrete Pulse Modulation Stategies for High Frequency Inverter Systems," IEEE-PESC Conf. Rec., 1989, which are incorporated herein by reference.

Figure 7:
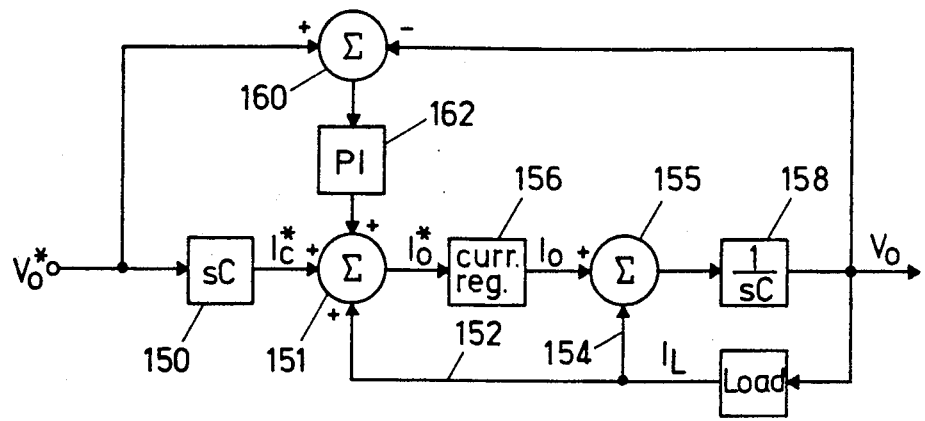
FIG. 7 is a block diagram of a load side controller for a USP system in accordance with the invention.
Figure 8:
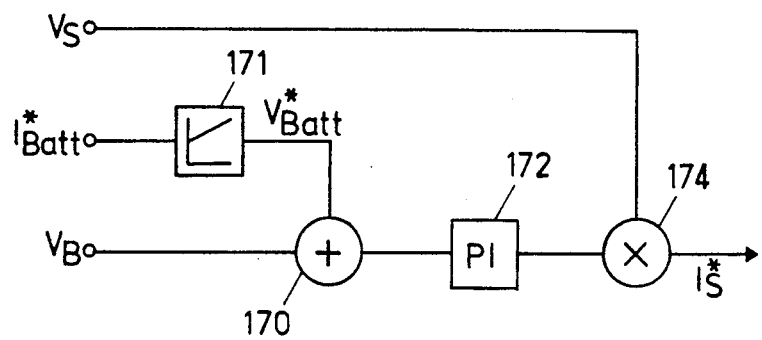
FIG. 8 is a block diagram of the synthesis of the input AC line reference $I_s^*$.

A variety of control options are available for providing simultaneous regulation of input and output currents as well as battery charging functions. For example, a block schematic of a controller required for synthesizing to two reference currents $I_s^*$ and $I_o^*$ is shown in FIG. 7 and 8. See, also, the article by Venkataramanan, et al., supra. To obtain good output regulation, especially in the presence of non-linear loads, a current regulator with reference and load feedforward is used. The reference output voltage $V_o^*$ is applied to a block 150 in FIG. 7 corresponding to the filter capacitor. This represents the fundamental component $I_c^*$ that must flow in the capacitor if the desired output voltage is to be obtained. The current $I_c^*$ is added at a junction 151 to the fundamental load current from $I_1$ a line 152 to generate a current reference $I_o^*$ for the converter section. The load current is considered to be a disturbance to the system, and is also compensated using feedforward on a line 154 to a summing junction 155 which also receives the value of $I_o$ through a current regulator 156. This approach gives extremely good dynamic characteristics as well as voltage regulation, even in the presence of substantial load non-linearities. The output of the junction 155 is integrated (156) to provide the output voltage $V_o$ which is compared in a summing junction 160 with the reference $V_o^*$ and the difference is passed through a proportional-integral compensator 162, the output of which is supplied to the summing junction 151.

The input current reference $V_s^*$ is derived from the dual requirements of DC bus regulation and battery charge and discharge requirements. The battery voltage $V_B$ is compared at a summing junction 170 with a reference voltage $V_{batt}^*$ derived at 171 from the reference battery current $I_{batt}^*$ and the differences is provided to a proportional-integral controller 172, the output of which is provided to a multiplying junction 174 which also receives the supply voltage $V_s$. The proportional-integral controller is used to accomplish power balance, taking into account the powerflow into the battery. The output of the proportional-integral regulator is multiplied with the input supply voltage $V_s$ to realize a template for the input current waveform $I_s^*$.

For the hard switching pulse width modulated (PWM) system of FIG. 4, a two output variation of the dead-beat control proposed in K. P. Gokhale, et al., "Dead-Beat Microprocessor Control of PWM Inverter for Sinusoidal Output Waveform Synthesis," PESC 85 Conf. Rec., pp. 28–36, is possible. However, the resonant DC link inverter of FIG. 6 is capable of superior performance. Control using discrete pulse modulation stategies, necessary in resonant link systems, requires a different approach. In PWM systems, the existence of a finite switching period implies the concept of an average value over a cycle, defined by the duty factor. In discrete pulse modulation, where only the possible switching instants are know, there is no equivalent period of repetition. Consequently, open loop systems are virtually impossible to implement, and a closed loop regulator is required. This is not a drawback in most implementations.

The discrete pulse modulated current regulator can be implemented in various ways. Most appealing appears to be an optimal cost function regulator. See the article by Vekatarmanan, et al., supra. Discrete pulse modulators (DMP) systems which allow the selection of optimal inverter states to fulfill defined cost functions are relatively easy to implement. A typical cost function could be the following:

$$J = k \cdot Abs(I_s^* - I_s) + Abs(I_o^* - I_o)$$

Where k is a scaling factor which indicates the relative importance of regulating $I_o$ or $I_s$. The cost function J is calculated for all the four states (1,0+,0−,−1), and the state which realizes the lowest value is selected. This approach has been implemented in the past, but is fairly complex.

A simpler implementation which gives very good performance uses the output voltage information. Whenever $V_o$ is sufficiently large, it can drive the output inductor current $I_o^*$ with sufficient slope to allow current control. Under these conditions, the inverter output is switched between an active vector (i.e., +1) and zero. This permits control of the input side current. Whenever the voltage $V_o$ is close to zero, the inverter is swtiched from one active state to another to control the inverter current, but with one resonant link cycle spent on the zero state. This implementation requires comparators checking on the instantaneous errors in the load and line side inductor currents and a signal indicating the presence of adequate back EMF. A simple state sequencer is then sufficient to generate the control functions needed.

Figure 9:
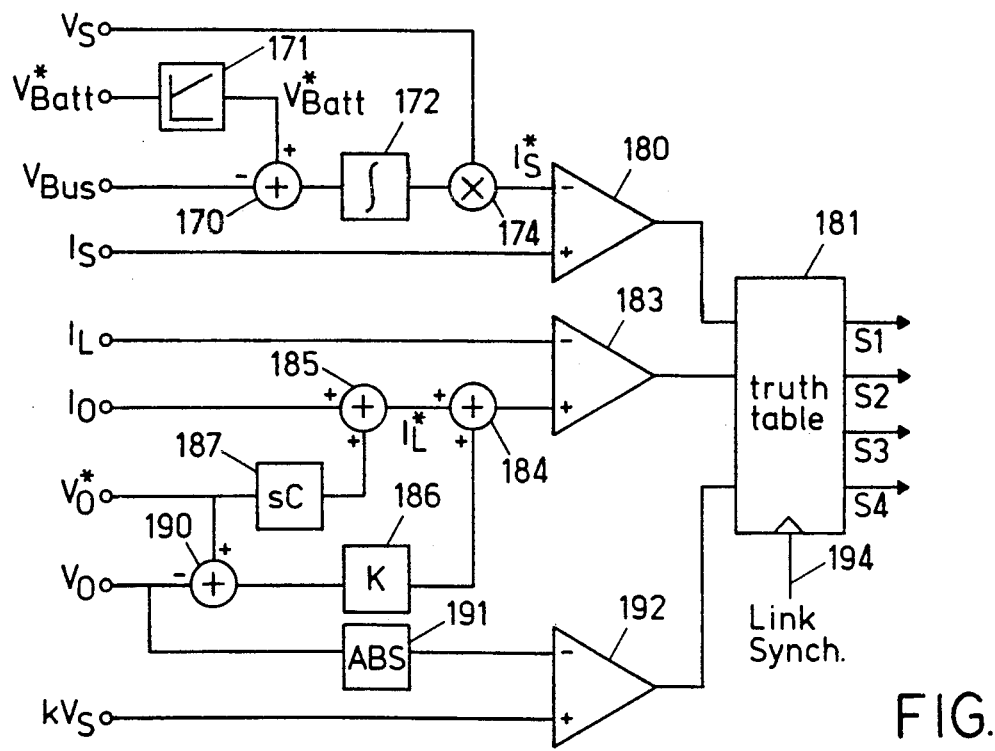
FIG. 9 is a block diagram of a controller for the UPS system of FIG. 4 which accomplishes simultaneous control of the input and the output.

A block diagram of the controller implemented in accordance with the foregoing procedures is illustrated in FIG. 9. The $I_s^*$ reference is generated in the same manner as illustrated in FIG. 8, and yields a value $\tilde{I}_s^*$ which is compared with the measured current value $\tilde{I}_s$ in a differential amplifier 180, the output of which is provided as an input to a logic circuit 181 which provides the gating control outputs to the four active switches in the inverter. Another input to the logic circuit 181 is provided from a differential operational amplifier 183 which receives at its two inputs the load current $I_1$ and the signal obtained from the output of a summing junction 184 which receives inputs from another summing junction 185 and from a gain control circuit 186 which provides a constant, K, to the signal applied thereto. The inputs to the junction 185 are the output current $I_o$ and the reference voltage $V_o^*$ passed through the capacitor 187. The input to the gain function 186 is provided from a summing junction 190 which compares the reference voltage $V_o^*$ with $V_o$. $V_o$ is also applied through an absolute value function 191 to one of the inputs of a differential amplifier 192 which recieves at its other input a scaled source voltage $kV_s$. The output of the amplifier 192 is also provided to the logic circuit 181. The circuit 181 also receives a link sychronization signal on a line 194 which provides timing information to properly time the gating signals to the gates of the active switching devices in the inverter bridge.

Figure 10:
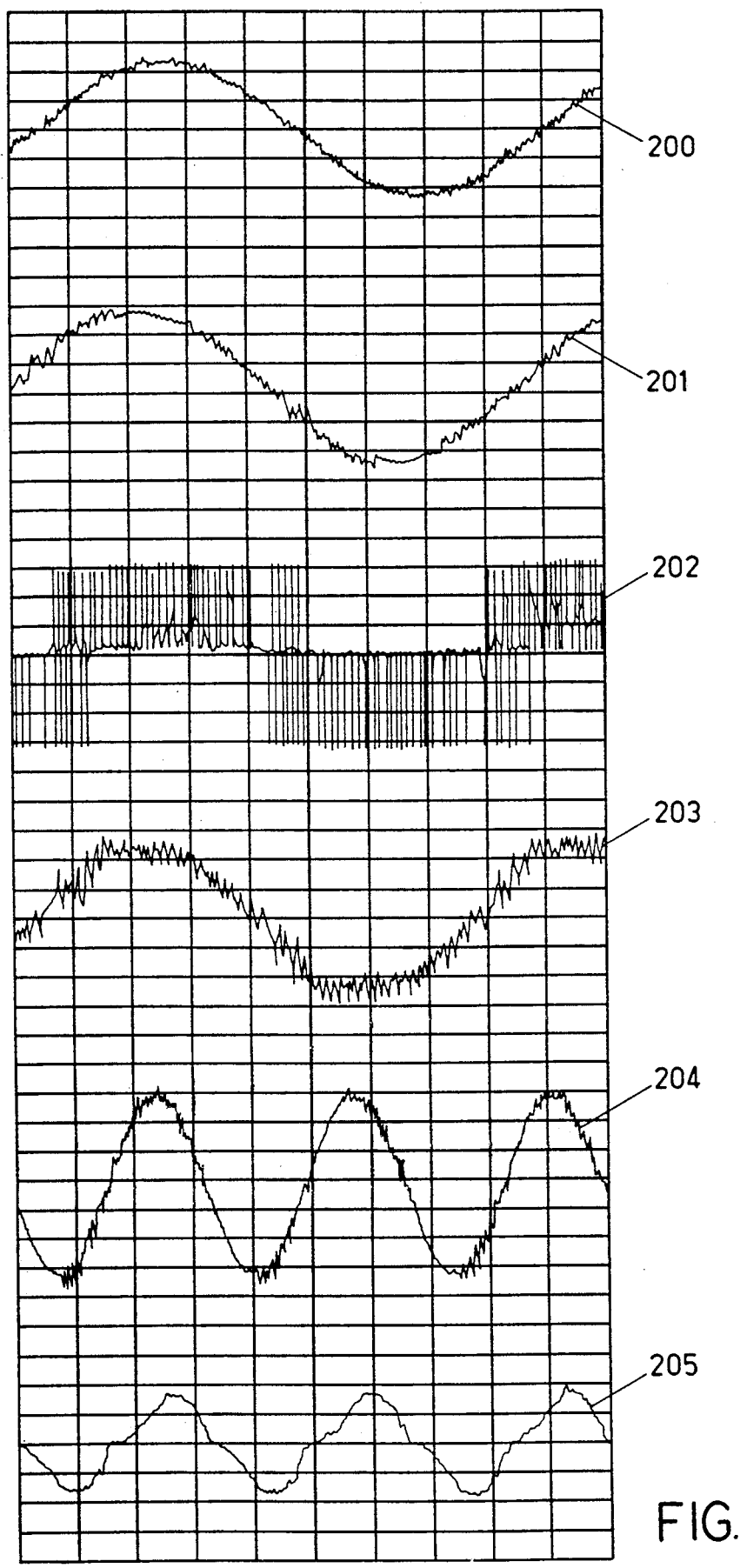
FIG. 10 are waveforms for the resonant DC link inversion apparatus of FIG. 6 including output voltage, inductor current, inverter line to line voltage, and inductor current, supply voltage, and supply current.

As an example of the implementation of the invention, a conversion apparatus utilizing the resonant DC link converter of FIG. 6 was implemented using BJT darlington transistor modules switched at a link frequency of 27 KHz. A controller as described above with respect to FIG. 9 was utilized which incorporates feedforward concepts as well as a discrete pulse modulation strategy. The waveforms of FIG. 10 illustrate the proper regulation of the input and output currents as well as control boost operation from the AC line to the DC link. The graphs in FIG. 10 show filter output voltage (200), output inductor current $I_o$ (201), inverter line to line voltage (202), input inductor current (203), supply voltage (204), and supply current (205). The line to line inverter output voltage waveform confirms the modulation strategy where plus and minus 1 transmissions are only permitted under low back EMF conditions, and even then only after a one cycle wait at a zero state. The resonant DC link converter implementation also realizes the benefit of low acoustic noise, low electromagnetic interference, excellent harmonic performance and dynamic performance, and high efficiency.

It is thus seen that the conversion apparatus in accordance with the present invention allows the achievement of several advantageous features. These include the requirement for only four switches, or five with a low voltage battery and resonant link operation, boost control from the AC line to the DC link, independent control of both input and output sides, a common neutral between the input and output, line conditioning in addition to a UPS function, sinusoidal input AC line currents irrespective of the load current, and the accomplishment of battery charge and discharge control with no additional devices.

It is understood that the invention is not restricted to embodiments set forth herein as illustrative, but embraces all such forms thereof as come within the scope of the following claims.

What is claimed is:

1. Power conversion apparatus for providing AC to DC to AC power conversion comprising:
   (a) AC input terminals adapted to be connected to a single phase AC power source and AC output terminals adapted to be connected to a load;
   (b) a pair of DC bus lines;
   (c) a rectifier bridge connected to one of the AC input terminals to rectify the current supplied thereto and connected between the DC bus lines;
   (d) a DC power source operably connected to provide DC power to the DC bus lines;
   (e) an inverter comprised of gate controllable active switching devices connected in a full bridge configuration across the DC bus lines and having two output nodes, the output nodes of the bridge connected to the output terminals for the conversion apparatus;
   (f) a common neutral line being common to one of the input terminals to the apparatus, to one of the output terminals of the apparatus and to one of the output nodes of the inverter bridge;
   (g) control means for controlling the switching of the controllable switching devices to provide AC output power at a selected frequency at the output terminals of the power conversion apparatus.

2. The apparatus of claim 1 including an input inductor connected between the one input terminal to the apparatus which is connected to the rectifier bridge and an inductor connected to the output terminal which is not connected to the common line.

3. The apparatus of claim 1 wherein the control means carries out control utilizing pulse width modulation of the switching of the switching devices.

4. The apparatus of claim 1 including DC resonant link means, connected between the DC source and the DC bus line, for providing a resonant transfer of DC power from the DC source to the DC bus at a selected high frequency.

5. The apparatus of claim 4 wherein the resonant link means includes a gate controllable switching device connected between the DC source and the DC bus line.

6. Power conversion apparatus for providing AC to DC to AC power conversion comprising:
   (a) AC input terminals adapted to be connected to a single phase AC power source and AC output terminals adapted to be connected to a load;
   (b) a pair of DC bus lines;
   (c) a rectifier bridge connected to one of the AC input terminals to rectify the current supplied thereto and connected between the DC bus lines;
   (d) a DC power source operably connected to provide DC power to the DC bus lines, wherein the DC source is a battery and the apparatus is adapted to function as an uninterruptible power supply to provide AC power to the output terminals from the battery when power is not being supplied to the input terminals of the apparatus;
   (e) an inverter comprised of gate controllable active switching devices connected in a full bridge configuration across the DC bus lines and having two output nodes, the output nodes of the bridge connected to the output terminals for the conversion apparatus;
   (f) a common neutral line being common to one of the input terminals to the apparatus, to one of the output terminals of the apparatus and to one of the output nodes of the inverter bridge;
   (g) control means for controlling the switching of the controllable switching devices to provide AC output power at a selected frequency at the output terminals of the power conversion apparatus.

7. The apparatus of claim 6 including a bypass line extending from one of the input terminals of the apparatus to one of the output terminals of the apparatus and a controlled switching device connected in the bypass line to allow AC power from the input terminals to be supplied directly to the output terminals under normal operating conditions when power is available from the AC power system to be supplied to the input terminals.

8. The apparatus of claim 7 further including a controllable switching device connected in a line leading to an output terminal from the apparatus to be controllably switched to isolate the apparatus from the output terminals when power is being supplied from the AC power lines directly to the output terminals.

9. The apparatus of claim 7 further including a transformer connected to the output terminals of the apparatus at a tap on the primary and wherein the bypass line is connected to the end terminals of the primary of the transformer, with the secondary of the transformer having terminals which can be connected to a load.

10. The apparatus of claim 6 wherein the control means further provides rectified power flow from the AC input terminals to charge the battery during periods of operation of the apparatus in which battery power is not required.

11. The apparatus of claim 6 wherein the control means utilizes discrete pulse modulation for control of the gate controllable switching devices.

12. The apparatus of claim 6 wherein the control means monitors the input terminal source current, the input terminal source voltage, the output terminal current and the output terminal voltage, and utilizes these signals to control the switching devices in a closed loop manner to control the system to seek to follow a desired output voltage, input source current, and output load current.

* * * * *